US005197847A

United States Patent [19]

Kremer et al.

[11] Patent Number: 5,197,847

[45] Date of Patent: Mar. 30, 1993

[54] DEVICE FOR AUTOMATIC HANDLING OF OBJECTS

[75] Inventors: Norbert Kremer, Dudelange; Georges Beck; Andre Bock, both of Luxembourg; Charles Hennico, Useldange, all of Luxembourg

[73] Assignee: Paul Wurth S.A., Luxembourg

[21] Appl. No.: 739,284

[22] Filed: Aug. 1, 1991

[30] Foreign Application Priority Data

Sep. 26, 1990 [LU] Luxembourg .......................... 87812

[51] Int. Cl.[5] .............................................. B65G 35/00

[52] U.S. Cl. ...................................... 414/752; 901/40; 414/10; 414/786; 294/63.1; 294/65; 294/86.41; 266/281; 264/30

[58] Field of Search ..................... 414/749, 752, 798.2, 414/10; 901/40; 52/747, 749; 294/65, 63.1, 86.41; 264/30; 266/281, 283, 286

[56] References Cited

U.S. PATENT DOCUMENTS 4,242,025 12/1980 Thibault .......................... 414/752 X
4,708,562 11/1987 Melan et al. .
4,720,226 1/1988 Legille et al. .
4,758,036 7/1988 Legille et al. .
4,786,227 11/1988 Kremer et al. ........................ 414/10
4,989,843 2/1991 Dittrich et al. .................... 266/283
5,018,923 5/1991 Melan et al. ......................... 414/10

*Primary Examiner*—Michael S. Huppert
*Assistant Examiner*—Donald W. Underwood
*Attorney, Agent, or Firm*—Fishman, Dionne & Cantor

[57] ABSTRACT

The device mounted at the end of an operating arm comprises one or more suckers for supporting objects, for example refractory bricks for the brick-lining of a metallurgical converter, means for linear and angular displacement of the suckers, sensors for monitoring and controlling automatically the means of displacement in order to grip and position the objects in a predetermined location, after immobilization of the operating arm. The suckers are provided on a sucker-carrying plate which in its turn is supported by a pair of blocks which can slide in transverse slide bars of a carriage which comprises a pair of longitudinal slide bars, perpendicular to the transverse slide bars and housed in sliding fashion in a central support attached to the end of the operating arm with a degree of angular freedom and a degree of linear freedom orthogonal to the axes of the longitudinal and transverse slide bars.

16 Claims, 4 Drawing Sheets

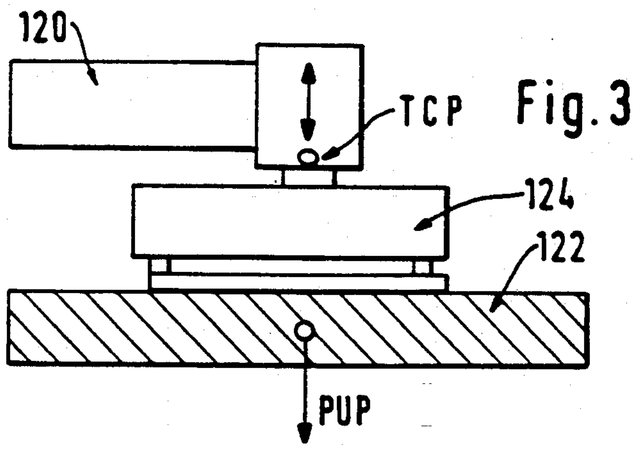
Fig. 3
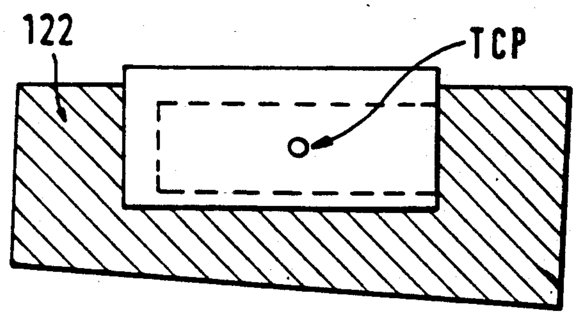
Fig. 4
Fig. 5
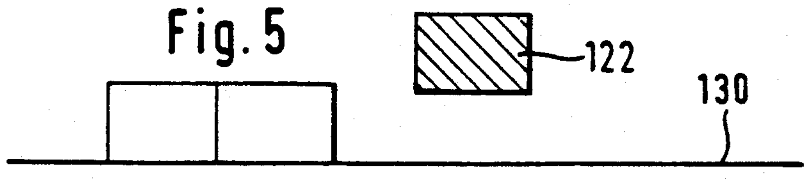
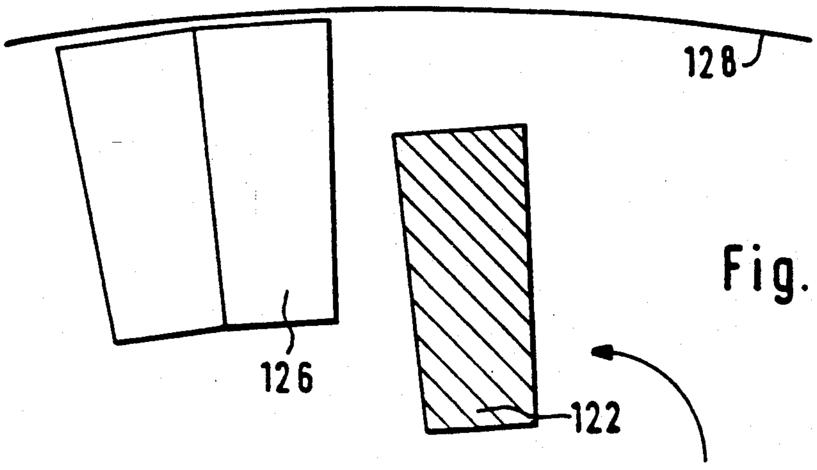
Fig. 6

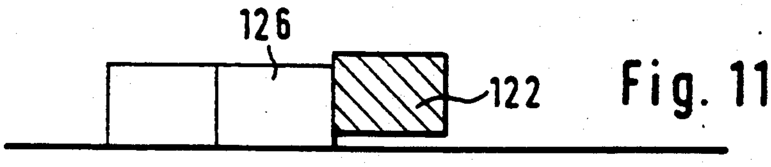
Fig. 11
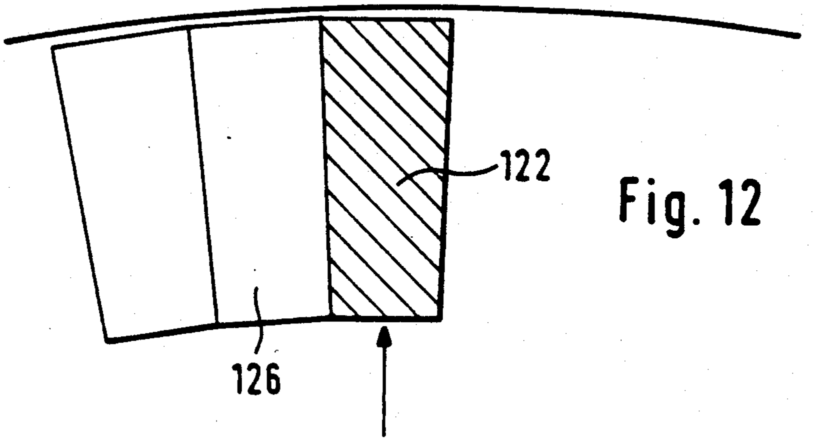
Fig. 12
Fig. 13
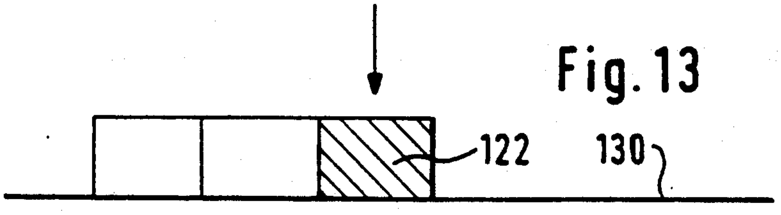
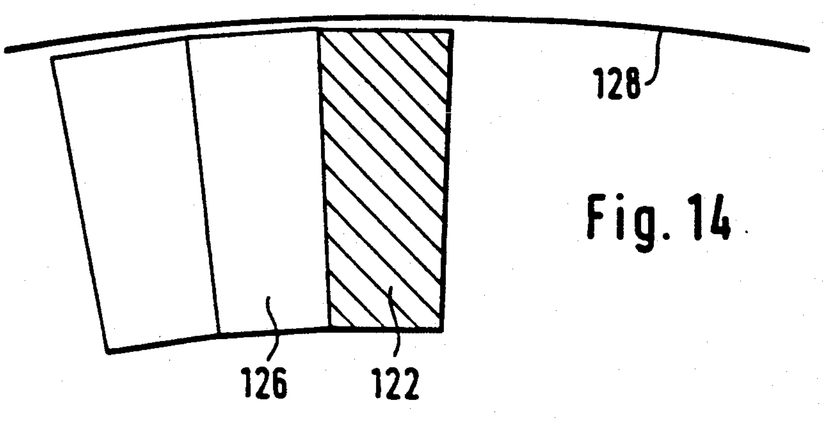
Fig. 14

DEVICE FOR AUTOMATIC HANDLING OF OBJECTS

TECHNICAL FIELD

The present invention relates to a device for the automatic handling of objects.

Although not being limited thereto, the present invention relates more particularly to a manipulator of refractory bricks for forming a refractory lining of a metal enclosure such as a steelmaking converter, and the invention will be described in more detail with reference to this advantageous application.

BACKGROUND OF THE INVENTION

We are currently witnessing a breakthrough in the more or less developed mechanization of the brick-lining of converters, ranging from the automation of the circuit for supplying the bricks, via systems facilitating the manual work at the brick-lining platform, to robotized systems for the complete operation of brick-lining converters. Such an installation for brick-lining a converter is, for example, described in the document FR 2,638,774.

The reasons for introducing automatic and robotized systems for brick-lining converters are essentially economic and ergonomic ones. However, the use or robots to replace manual work can only be considered when it enables virtually all manual intervention to be eliminated and when the working rate is at least as fast and accurate as manual laying.

In order to increase the speed and the accuracy of the brick-lining, the document EP 0226076 B1 proposes a working robot which is installed on a platform inside the converter and the feature of which is that the function of transporting the bricks, on the one hand, and putting these in place, on the other hand, are separate. This is effected by virtue of an automatic manipulator provided at the end of the operating arm of the robot. This operating arm brings the bricks automatically, at high speed, into a working zone forming the field of action of the manipulator and situated at a predetermined distance from the bricks already laid and from the wall of the converter in order to avoid any risk of collision. The operating arm of the robot is then immobilized in this working zone, and the manipulator performs the accurate positioning, at low speed, of the bricks.

The manipulator is equipped with feelers and with displacement detectors in order to monitor and control automatically the action of the various elements permitting the exact positioning of the bricks. The measurements supplied by the positioning detectors and feelers also make it possible to recalculate, after each laying of a brick, the movement to be made by the operating arm in order to displace the next brick into the field of action of the manipulator, and/or to order the robot, using the control computer, to select a different type of brick in order to adapt the brick-lining to the curvature and to the deformations of the wall of the converter.

This manipulator can be criticized for a certain lack of adaptability and flexibility, in particular because the bricks are held between two claws of a gripping device. This requires a very accurate operation of the manipulator since any error in calculation, however small, causes a collision with the bricks already laid, or, should the gripping device open, a brick to fall onto the bricks already laid. Moreover, the absence of the possibility of the bricks or the manipulator pivoting about a radial axis is a handicap when the laying plane is not parallel to the plane of the platform, e.g. when the laying takes place in a spiral or when the platform is slightly inclined with respect to the horizontal. Another disadvantage is that the brick is laid on the underlaying brick and against the adjacent brick before being pushed into its final position towards the wall. This friction against the adjacent and underlying bricks can cause them to be displaced and, furthermore, requires higher forces, which increases the power and the size of the manipulator.

SUMMARY OF THE INVENTION

The object of the present invention is to provide an improved manipulator in which the bricks are held by suckers and which has a greater working adaptability together with a reduced operating power.

In order to achieve this objective, the invention proposed a device for the automatic handling of objects, mounted at the end of an operating arm and comprising one or more suckers for supporting the said objects, means for the linear and angular displacement of the said suckers, and sensors for monitoring and controlling automatically the said displacement means in order to grip and position the said objects in a predetermined location after immobilization of the operating arm. In its Preferred embodiment, the device is essentially characterized in that the suckers are provided on a sucker-carrying plate which in its turn is supported by a pair of blocks which can slide in transverse slide bars of a carriage, the said carriage furthermore comprising a pair of longitudinal slide bars, perpendicular to the transverse slide bars and housed in sliding fashion in a central support attached to the end of the operating arm with a degree of angular freedom and a degree of linear freedom, orthogonal to the axes of the longitudinal and transverse slide bars.

The sucker-carrying plate is, preferably, attached to the blocks by means of spring bumper pads made of rubber.

Contrary to the known manipulator described hereinabove, the objects are carried by rubber suckers and not by gripping devices. This mounting by suckers, in association with the spring bumper pads, imparts more adaptability to the operating and to the manipulation and permits compensation or absorption of the small shocks, i.e. as it is called in the art of robotics, "passive compliance".

According to a preferred embodiment, the device comprises tow tension pulleys mounted respectively on each of the blocks and four return pulleys mounted respectively at the four corners of the carriage, a reciprocating compressed air motor fixed on the carriage, a first tension cable stretched between one of the ends of the motor and the carriage and passing over a return pulley and the tension pulley of a block in order to cause the latter to slide in a first transverse direction, a second tension cable stretched between the opposite end of the motor and the carriage and passing over two return pulleys and the tension pulley of the other block in order to cause the latter to slide in a second transverse direction opposite to the first, and a synchronizing cable stretched between two opposite points of the carriage and passing over the tension pulley of each of the blocks and three return pulleys, in order to transmit the movement of that of the blocks which is pulled by the motor to the other block and vice versa. In other words, in one direction, it is the first block which is pulled by the motor, the second block following the movement of the first clock by means of the tension cable, whereas in the opposite direction, it is the second block which is pulled by the compressed air motor and the first block follows the movement of the second block by means of the synchronizing cable. There results thereform a perfect synchronization between the movements of the two blocks, which prevents any risk of jamming, compared to the case where both blocks would be simultaneously activated by the motor.

The compressed air motor and one of the blocks may each be associated with a displacement sensor.

The carriage is, preferably, associated with plurality of sensors measuring its displacement and position according to three orthogonal coordinate axes.

The central support may be integral with a piston rod of a pneumatic cylinder, the displacement of which is orthogonal to the axes of the longitudinal and transverse slide bars, while the cylinder is rotatable about the axis of displacement of its piston by virtue of a bearing mounting of the cylinder in the end of the operating arm. This pneumatic cylinder may be associated with a sensor for axial displacement of the piston.

The degree of angular freedom between the pneumatic cylinder and the operating arm is complemented by a degree of angular freedom between the piston and the cylinder, which latter degree of freedom can be counteracted in a controlled manner by virtue of two pneumatic springs fixed on the central support on either side of an arm integral with the pneumatic cylinder.

The pneumatic cylinder and its piston may be associated with an angular sensor for measuring the angle of rotation of the carriage and of the piston, which rotation is permitted by the degree of freedom, which may be counteracted.

BRIEF DESCRIPTION OF THE DRAWINGS

Other features and characteristics will emerge from the detailed description of an advantageous embodiment of a device for the automatic handling of bricks for the brick-lining of a converter, described hereinbelow, by way of illustration, by reference to the attached drawings in which:

FIGS. 3 to 14 represent diagrammatically the various operative phases for transporting and laying of a brick by means of the manipulator according to the present invention.

DETAILED DESCRIPTION OF THE INVENTION

Figure 1:
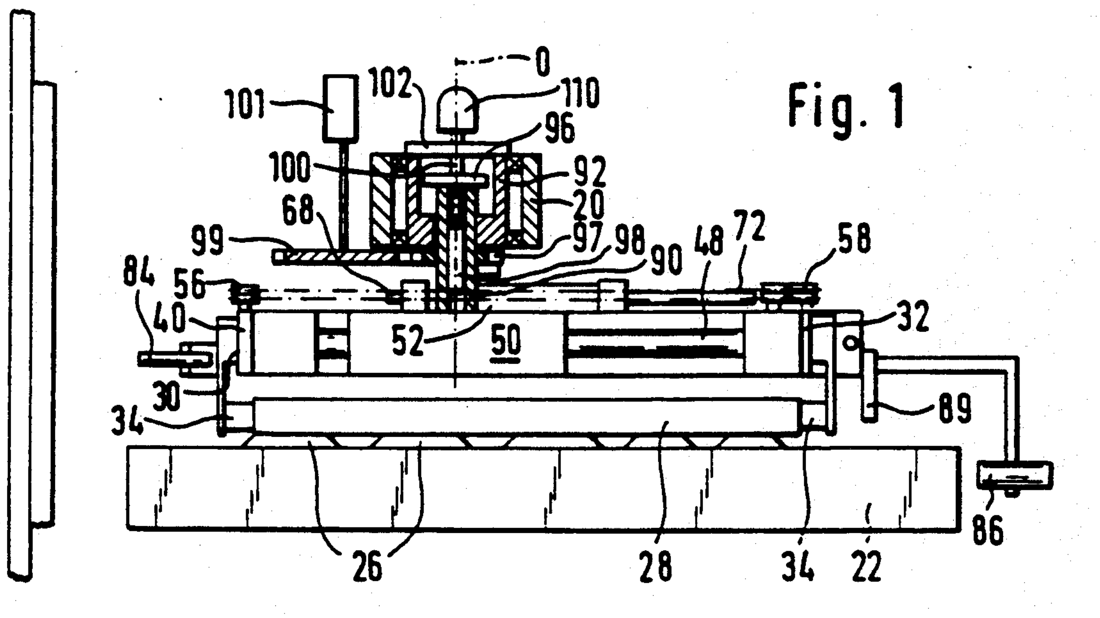
FIG. 1 shows diagrammatically, in partial section, a lateral view of the manipulator.
Figure 2:
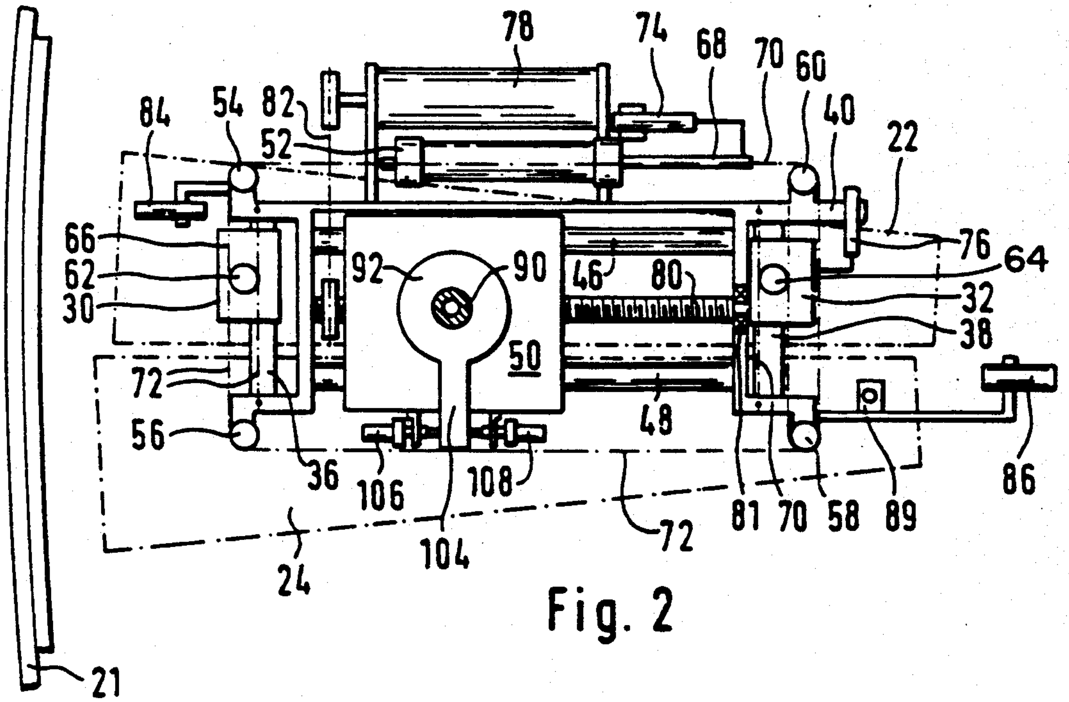
FIG. 2 shows diagrammatically a plan view of the same manipulator.
Figure 7:
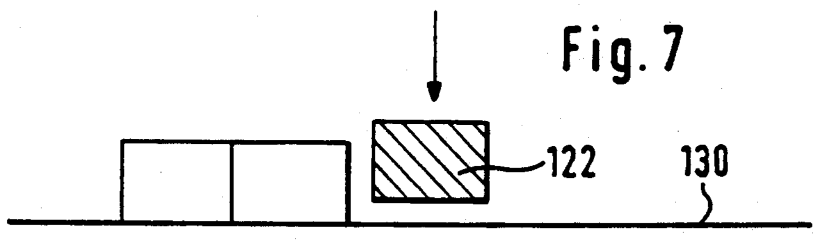
Figure 8:
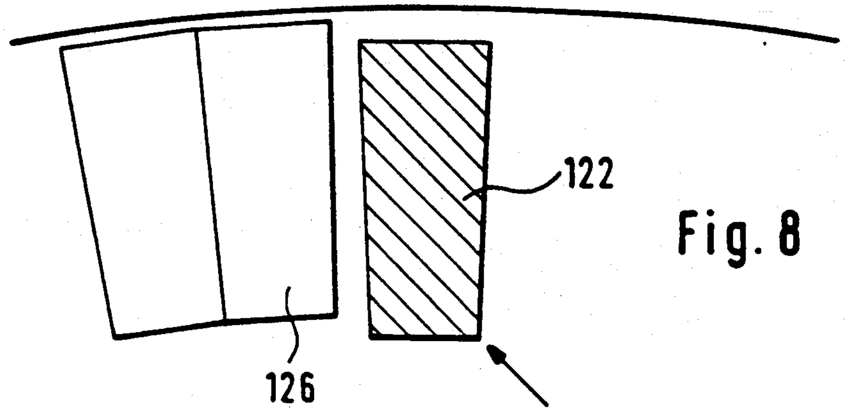
Figure 9:
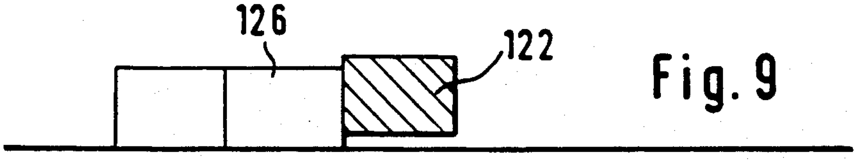

FIGS. 1 and 2 represent a manipulator according to the present invention and which is mounted at the end of an operating arm 20 of a robot, not shown but provided, on a displaceable platform inside a converter, for the lining of the wall 21 of the latter. The manipulator is represented in FIGS. 1 and 2 in an operative position for the positioning of a brick 22 against a brick 24, already placed, after immobilization of the operating arm 20 in the field of action of the manipulator. As represented in FIG. 2, the bricks 22 have a trapezoidal section in order to be able to effect a circular brick-lining. Furthermore, in order to be able to adapt the brick-lining to various radii of curvature and to compensate for possible deformations of the wall of the converter, in general two types of bricks of different conicities are provided.

As FIG. 1 shows, the bricks are gripped by the manipulator by means of a series of suckers 26 provided on the lower face of a sucker-carrying plate 28 and connected to a vacuum pump (not shown). The sucker-carrying plate 28 is supported by two blocks 30, 32 by means of a plurality of spring bumper pads 34 made of rubber. The brick 22 is therefore not supported in a rigid manner by the manipulator. By virtue of the bumper pads 34 and of the flexible character of the rubber suckers 26 and the plate 28 is comparable to a kind of suction with a certain adaptability permitting absorption of the small shocks and compensation of certain irregularities or inaccuracies in the operating. This adaptability likewise permits adaptation of the laying to various slopes according to the radius of the converter, when the brick-lining is carried out in a spiral, or to compensate for a slight slope of the platform in relation to the plane of the brick-lining.

It is to be noted that the presence of a plurality of suckers 26 allows the selective connection of the latter to various suction circuits in order to be able to manipulate bricks of various lengths without changing the sucker-carrying plate.

As represented in FIG. 2, the two blocks 30, 32 may respectively slide along two transverse slide bars 36, 38 which form part of a carriage 40 forming the framework of the manipulator.

The carriage 40 further comprise two longitudinal slide bars 46,.48 which are perpendicular to the transverse slide bars 36, 38 and which traverse a central support 50 in which they are supported and through which they may slide longitudinally. In the position in FIG. 2, the sucker-carrying plate 28 is therefore displaceable, together with the brick 22, transversely towards the laid brick 24 by sliding of the blocks 30 and 32 on the slide bars 36 and 38, while a longitudinal displacement of the carriage 40 by sliding of the slide bars 46, 48 through the central support 50 permits a displacement of the plate 28 and of the brick 22 parallel with the brick 24 already laid. The sliding of the blocks 30 and 32 on their slide bars 36 and 38 is generated by the action of a motor, in this case a compressed air motor 52 fixed to one of the longitudinal sides of the carriage 40.

According to one of the features of the present invention, this driving of the blocks 30 and 32 is effected by tension cables. For this purpose, the carriage 40 carries on each of its upper corners a return pulley 54, 56, 58 and 60. As FIG. 1 shows, each of these return pulleys is a double pulley, that is to say with two superposed grooves in order to be able to cause two cables to be passed around the same pulley. In principle the pulleys 54 and 56 could be single pulleys, but for reasons of convenience or of exchangeability it is preferable for them all to be double. One the two blocks 30 and 32 are further provided tow tension pulleys 62, 64, respectively which are likewise double pulleys. A first tension cable 66 represented by long broken lines is stretched between the carriage 40 and one of the ends of the piston rod 68 of the compressed air motor 52, passing over the tension pulley 62 of the block 30 and the return pulley 54. A second tension cable 70 is stretch between the other end of the piston rod 68 and the carriage 40, passing around the traction pulley 64 of the other block 32 and around the return pulleys 58 and 60. A synchronizing cable 72 represented by short broken lines is moreover stretched between two diametrically opposed ends of the carriage 40, passing successively around the first tension pulley 62, around the return pulleys 56, 58 and 60 and around the second tension pulley 64. These three cables are all fixed, at least at one of their ends, by means of an adjusting nut, known per se, in order to be able to adjust their tension and to compensate for any possible elongation.

When the compressed air motor 52 is actuated, starting from its extreme position in FIG. 2, in the direction of a displacement of its rod 68 towards the left, the cable 70 drives, by winch effect, the pulley 64 with the block 32 in order to displace the brick 22 transversely towards the brick 24. This movement is transmitted by the pulley 64 to the synchronizing cable 72 which, as a result, exerts the same winch effect on the pulley 62 of the other block 30, in such a manner that the latter must follow the movement of the opposite block 32. There is, therefore, a perfect and enforced synchronization between the movements of the two blocks 30 and 32, which prevents any risk of jamming of the blocks on their slide bar. It is to be noted that , by the winch effect, the speed of displacement of the blocks corresponds to half the speed of displacement of the rod 68, while the tensile force of the rod 68 is evenly distributed to each of the tension pulleys 62 and 64.

When the movement of the compressed air motor 52 is reversed in order to displace the rod 68 towards the right, e.g. into the position illustrated in FIG. 2, it is the block 32 which is subjected, by means of the tension cable 66, to the action of the rod 68, while the movement of the block 30 pulls, by means of the pulley 62, the synchronizing cable 72 which, in turn, drives the block 32 in a synchronous movement in order to move the plate 28 transversely away from the brick 24.

The position and the displacement of the rod 68 of the compressed air motor 52 are measured by means of a sensor 74 known per se. An analogous sensor 76 is associated with one of the blocks, in this case with the block 32 in order to measure the position and the transverse displacement of the blocks and of the brick 22.

The pneumatic control of the motor 52 is designed is such a manner as to detect automatically the contact between the brick 22 and the stationary brick 24 during the transverse displacement by the counteraction at the moment of the contact. This pneumatic control is further designed so as to actuate the motor 52 with different pressures depending on needs and requirements. Thus the manipulator operates at average pressure during a transverse displacement with the brick 22. A low pressure is used in order to maintain the brick 22 in contact with the laid stationary brick 24, while a high pressure is required for a possible correction of the position of the brick at the end of the laying operation.

The longitudinal displacement of the carriage 40 by sliding of the slide bars 46 and 48 through the central support 50 is effected by means of a worm screw 80 which is housed in a rotatable manner in a bearing of the carriage 40 and which extends through the block 50 in the center of the two longitudinal slide bars 46 and 48 and parallel to the latter. A rotation of the screw 80 consequently causes, depending on its direction of rotation, a displacement of the carriage 40 in one direction or in the other in relation to the central block 50. The driving of the worm screw 80 may be effected by a toothed belt 82 under the action of an electrical motor 78 fixed on the longitudinal side of the carriage 40 where a compressed air motor 52 is likewise situated.

The manipulator is equipped with a series of distance detectors, e.g. infrared or ultrasonic telemeters, the measurement of which are utilized in order to monitor and control the displacement of the movable components of the manipulator and, if desired, of the operating arm 20 and to recalculate the automatic program after each laying of a brick. At the front of the carriage 40 is situated a telemeter 84 which determines the distance of the brick in relation to the wall 21 of the converter. This telemeter is associated with a telemeter 86 which is situated at the rear of the carriage 40 and which measures the distance in relation to the inside face of the brick 24 already laid. Thee two telemeters 84 and 86 are responsible for the control of the electrical motor 78 which generates the longitudinal displacement of the carriage 40. A third telemeter 89 is directed vertically towards the base and measures the height of the brick 22 in relation to the brick on which it has to be laid. This telemeter 89 is responsible for the vertical movement of the manipulator, such as is described in more detail hereinbelow. Instead of being fixed on the carriage 40, these telemeters may be mounted, if necessary, on retractable arms in order to be able to draw them back into a parked position so as not to hinder the movements of the robot.

The two degrees of linear freedom in the plane of laying of the brick, which are managed by the motors 52 and 78, are complemented, at the joining of the manipulator with the operating arm of the robot 20, by a degree of vertical linear freedom perpendicular to the plane of the two aforementioned degrees and by a degree of annular freedom about the axis of the latter degree of vertical linear freedom. FIG. 1 shows that the central support 50 is integral with the rod 90 of the piston 96 of a pneumatic cylinder 92 carried in the end of the operating arm 20 by means of a bearing 94 allowing the pneumatic cylinder 92 a rotation around its axis 0 of mobility of its piston 96 and its rod 90 in relation to the operating arm 20. The pneumatic cylinder 92 allows by the axial mobility of its piston, the raising or the lowering of the carriage 40 and the brick 22 in relation to the operating arm 20. This axial movement is not only organized by the control program as a function of the measurements of the telemeter 89, but is likewise measured and controlled by a displacement detector 98 incorporated in the how of the rod 90 of the piston 96 and associated with an axial shaft 100 immobilized axially in relation to the piston 96 and its rod 90. The reference numeral 102 represents the cover for sealing the cylinder 92.

The pneumatic circuit for control of the cylinder 92 permits not only an automatic compensation of the weight of the manipulator and of its load, but also, during the lowering of the carriage, the control of the approach of the brick 22 to the plane of brick-lining, and the gentle laying thereof onto the brick in place. Furthermore, it acts as a pneumatic spring in the event of calculation error or of geometric irregularities in the brick to be laid or of that which is in place. It likewise, permits the automatic raising of the manipulator immediately after the laying of the brick, and after its release from the suckers 26.

Compensation for the weight of the brick has the advantage of reducing the friction forces. This compensation allows, as a result, the choice of a lighter construction, especially of the carriage and the motor. Furthermore, it reduces the risk of an accidental displacement of the bricks already laid under the effect of friction and reduces the reaction forces on the robot and the platform.

Concerning the rotation of the pneumatic cylinder 92 about the axis 0, an appropriate motor 101, e.g. an electrical motor, is mounted on the operating arm 20 and acts by means of a toothed belt or a driving pinion 99 on a crown gear 97 provided, e.g. on the lower face of the cylinder 92.

The rotation of the cylinder 92 is transmitted to the central block 50 and to the carriage 40 by means of a control arm 104 which is integral with the cylinder 92. This control arm is in the form of an "L" and extends horizontally above the support 50 and descends vertically along its longitudinal side which is opposite to that where the motors 52 and 78 are situated. On this same side are fixed two pneumatic springs 106 and 108 which form, when they are actuated, two end stops which just make contact with the two opposite sides of the vertical section of the control arm 104 and immobilize the support 50 in relation to the arm 104 and to the cylinder 92. Any rotation of the pneumatic cylinder 92 about the axis 0 consequently modifies, by means of its orientation control arm 104, the angular position of the manipulator about the axis 0. It is necessary therefore that the pneumatic springs 106 and 108 should be sufficiently powerful for the central support and the carriage 40 to be able to follow the angular movement of the arm 104. On the other hand, their spring effect allows them to give way under an abnormal force, e.g. in the event of an accidental collision of the manipulator with a fixed obstacle, in order to allow the support and the carriage 40 to occupy momentarily a different orientation to that imposed by the arm 104, this being done against the action of one or other of the two pneumatic springs 106 and 108.

Furthermore, the two springs 106 and 108 may be counteracted in a controlled manner, preferably automatically during the running of the compressed air motor 52, in order to release the orientation of the carriage 40 from the direction imposed by the arm 104 and to allow a pivoting of the carriage 40 about the axis 0 within the separation limits of the two pneumatic springs 106 and 108. This pivoting, made possible by the rotational freedom of the rod 90 and its piston 96 in relation to the pneumatic cylinder 92, is especially desirable during the transverse movement of the carriage 40 under the action of the motor 52 in order to allow an automatic correction to the alignment of the brick 22 on the brick 24 just laid. This possible pivoting is detected by an angular sensor 110 measuring the amplitude of rotation of the shaft 100, which is integral with the rotation of the rod 90. This measurement may be utilized in order to control an automatic correction of the orientation of the manipulator by a change in angular position of the pneumatic cylinder 92 during the laying of the next brick.

There will now be described, be reference to FIGS. 3 to 14, a complete cycle of accepting and laying of a brick. The correct accepting of a brick by the manipulator on the working platform implies that the robot known perfectly the orientation and the position of this brick on the platform. The automatic determination of these parameters may be entrusted, e.g. to an electronic vision system comprising a camera with an image processing unit. Moreover, with regard to the referencing, the positioning, the displacement and the measurements, it is necessary to identify the manipulator by a reference point, in this case the point TCP (Tool Center Point) represented in FIG. 3 and located preferably on the vertical axis 0 and of the manipulator. Likewise, the brick 122 to be gripped is identified by a reference point, in this case the point PUP (Pick Up Point) in FIG. 3.

The operating arm 120 of the robot and its manipulator 124, in a programmed orientation, are brought into a programmed position above the brick to be gripped, preferably in order that the reference position TCP of the manipulator 124 is in vertical alignment with the reference position PUP of the brick 122.

The orientation of the manipulator 124 is preferably determined in such a manner that the longitudinal axis thereof is parallel to the longitudinal side of the brick 122 which is intended to come into physical contact with a brick already in place. When the correct positioning of the robot and of the manipulator is effected, the gripping of the brick is carried out by suction by means of the suckers 26 and by lifting the brick 122 by pressure applied to the pneumatic cylinder 92, and by displacement of the arm of the robot.

The operating arm 122 is then displaced, with the manipulator 24 and its brick 122, at high speed into a zone close to the intended location for the siting of the brick 122, but at a sufficient distance from the bricks already laid and from the wall of the converter in order to prevent any risk of collision in this safety zone. The coordinates of this safety zone are determined automatically by the measurements made by the telemeters and sensors during the positioning of the previous brick 126. The zone thus envisaged is illustrated by the position of the brick in FIGS. 5 and 6.

In this provisional position illustrated by FIGS. 5 and 6, measurements are made, by means of the telemeters 84, 86, and 89, as to whether the distance of the brick 122 in relation to the wall 128 of the converter, in relation to the neighboring brick 126 and in relation to the row of lower bricks 130 does not exceed the field of action of the manipulator 124. Should this be the case, the provisional position according to FIGS. 5 and 6 is rectified at a reduced speed, as a function of the measurements supplied by the detectors, by displacement of the operating arm 120 in the direction of the arrows until the brick occupies the position represent in FIGS. 7 and 8. In this position the robot is immobilized and it is the manipulator which comes into operation in order to carry out the positioning of the brick 122.

Figure 10:
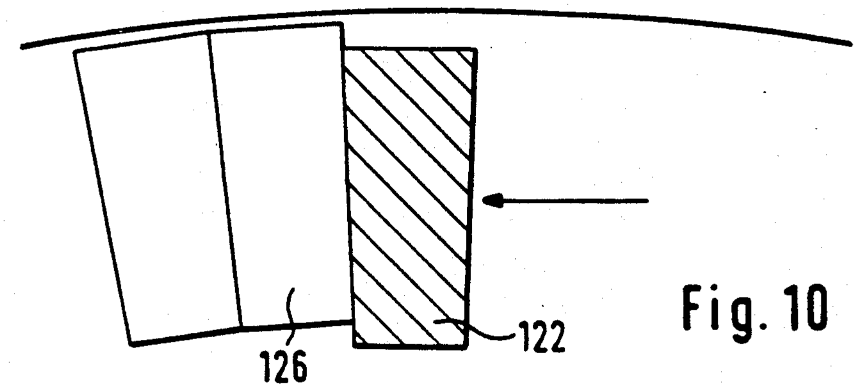

The next phase consists of displacing the brick 122 in the direction of the arrow illustrated in FIGS. 10 until there is physical contact with the neighboring brick 126. For this purpose, the compressed air motor 52 is actuated in order to displace laterally the blocks and the sucker-carrying plate 28 by means of the tension and synchronizing cables. During this movement, the pneumatic springs 106 and 108 are deactivated in order to allow the carrier 40 and the brick to be able to pivot about the vertical axis 0 in relation to the stabilization arm 104. This makes it possible to compensate for a possible orientation fault of the brick in relation to the brick 126 in place. The combination of this transverse movement and the Possibility of pivoting ensures a correct contact of the brick 122 with the brick 126 over the entire length of the latter, as illustrated in FIG. 10. The pivoting of the manipulator 40 during this phase is detected by the sensor 110 and is utilized in order to recalculate the orientation of the manipulator for the laying of the next brick. Likewise, the sensor 76 measures the lateral displacement of the block 32 and this measurement may be utilized in order to recalculate the movement of the robot for the laying of the next brick.

The following phase consists of displacing the brick 122 longitudinally in the direction of the arrow in FIG. 12. For this purpose, the motor 78 is actuated in order to cause the carriage 40 of the manipulator to slide longitudinally through the central support 50. During this moment, the pressure of the compressed air motor 52 is reduced, in order to diminish the friction between the brick 122 and the brick 126, but is maintained at a value sufficient to maintain the physical contact between the bricks. The amplitude of this displacement is programmed as a function of the measurements carried out during the laying of the previous bricks. However, the movement is monitored by the telemeter 84 which measures the distance up to the wall 128 of the converter and which may, if desired, control a correction of the program for longitudinally displacement by the motor 78, in one direction or the other, for example in the event of deformation of the wall 128.

The laying of the brick 122 is terminated by the lowering into the final position illustrated in FIGS. 13 and 14. For this purpose, the pneumatic cylinder 92 is actuated in order to lower the carriage 40 under the control of the measurements supplied by the telemeter 89, which makes it possible to reduce the speed when approaching the surface 130 and to ensure a gentle laying of the brick 122. The amplitude of the lowering movement is measured by the displacement detector 98 and this measurement is utilized, together with the measurement corresponding to the longitudinal and transverse displacement of the brick as well as the possible measurements of angular pivoting about the stabilization arm 104, in order to calculate the exactly position of the brick and to control the movement of the robot for the laying of the next brick.

When the brick 122 occupies the final correct position, the compressed air motor 52 is deactivated by disconnecting from its source of pneumatic pressure and the suckers 26 are disconnected from the vacuum pump and may be connected to a pressure source in order to release rapidly the brick 122 from the manipulator which is raised up in relation to the operating arm 20 under the action of the pneumatic cylinder 92.

During the return path of the operating arm 20 on the platform, in order to fetch the next brick, the two pneumatic springs 106 and 108 are activated again in order to ensure the angular stabilization and the correct orientation of the manipulator in relation to the operating arm 20. At the same time the motors 52 and 78 are actuated in order to displace the movable elements towards their starting position, while the information supplied by the displacement sensors is processed in the computer and, by comparison with set-up data, the path of the operating arm is recalculated for the laying of the next brick. The result of the comparison between the measurements of the position of the last brick and the set-up data likewise permits automatic determination of whether it is necessary to retain the same type of brick or whether it is necessary to change the type of order to respect the geometry of the brick lining.

While preferred embodiments have been shown and described, various modifications and substitutions may be made thereto without departing from the spirit and scope of the invention. Accordingly, it is to be understood that the present invention has been described by way of illustrations and not limitations.

What is claimed is:

1. A device for the automatic handling of an object, comprising:

suction means for supporting the object, said suction means comprising:

a suction plate for gripping the object;

carriage means for supporting the plate;

first mounting means for transversely slideably mounting the plate on the carriage means;

central support means for angularly and linearly displaceably supporting the carriage means on an operating arm;

second mounting means for longitudinally slideably mounting the carriage on the central support means; and displacement means for displacing said suction plate relative to the operating arm;

sensor means disposed at said carriage means for monitoring the position of the suction means; and control means, responsive to the sensor means, for automatically controlling the displacement means in order to grip the object and place the object in a predetermined location.

2. The device of claim 1, wherein the first mounting means comprise:

a pair of longitudinally extending transverse slide bars secured to said carriage; and a pair of blocks slideably mounted on said slide bars and secured to the suction plate.

3. The device of claim 2, wherein the first mounting means further comprise resilient pad means for attaching the blocks to the suction plate.

4. The device of claim 2, wherein the displacement means comprises:

tension pulley means mounted on said blocks;

return pulley means mounted on said carriage;

a reciprocating compressed air motor secured to said carriage;

first tension cable means, operatively attached to said motor, said tension pulley means and said return pulley means, for slideably displacing one of said blocks in a first transverse direction, second tension cable means, operatively attached to the motor, the tension pulley means and the return pulley means for slideably displacing the other of said blocks in a direction opposite the first transverse direction;

synchronizing cable means, operatively attached to the carriage, tension pulley means and return pulley means, for transmitting movement of that block being displaced by the motor to the other block.

5. The device of claim 2, wherein said second mounting means comprises a pair of longitudinally extending longitudinal slide bars mounted on said operating arm and slideably received by the carriage means and wherein the displacement means comprises:

an electric motor secured to said carriage, and worm screw means, rotatably mounted on said carriage, extending parallel to and between said longitudinal slide bars and being operatively associated with the electric motor and the central support means, for longitudinally displacing the carriage relative to the central support means.

6. The device of claim 4, wherein the sensor means comprises:

displacement sensor means for sensing displacement of one of the blocks.

7. The device of claim 3, wherein the operating pressure of the compressed air motor is adjustable.

8. The device of claim 4, wherein the sensor means comprises a plurality of telemeters for measuring the position of the carriage means according to three orthogonal coordinate axes.

9. The device of claim 2, further comprising:
a pneumatic cylinder and a piston received within said pneumatic cylinder, said piston being attached to the central support means, wherein the piston is axially displaceable relative to the cylinder along an axis orthogonal to the axes of the transverse and longitudinal slide bars; and
bearing means for rotatably mounting the cylinder on the operating arm so that the cylinder is rotatable about the axis of displacement of the piston.

10. The device of claim 9, further comprising:
axial sensor means disposed at said piston for sensing axial displacement of the piston relative tot he pneumatic cylinder.

11. The device of claim 9, wherein the bearing means provides a first degree of angular freedom between the pneumatic cylinder and the operating arm and wherein the first degree of angular freedom is complemented by a second degree of angular freedom between the pneumatic cylinder and the piston, and wherein the device further comprises pneumatic spring means, operatively attached to the operating arm and the pneumatic cylinder for counteracting the second degree of freedom in a controlled manner.

12. The device of claim 11, wherein the sensor means comprises:
angular sensor means for measuring the angle of rotation of the carriage and the piston.

13. The device of claim 11, further comprising:
power transmission means for modifying the orientation of the carriage relative to the operating arm;
said transmission means comprising:
a crown gear;
a driving pinion operatively associated with the crown gear; and
a motor for driving the pinion.

14. A robot for the automatic handling of an object, comprising:
a displaceable operating arm;
a handling device secured to the operating arm; said handling device comprising:
suction means for supporting the object, said suction means comprising:
a suction plate for gripping the object;
carriage means for supporting the plate;
first mounting means for transversely slideably mounting the plate on the carriage means;
central support means for angularly and linearly displaceably supporting the carriage means on an operating arm;
second mounting means for longitudinally slideably mounting the carriage on the central support means, and
displacement means for displacing said suction plate relative to the operating arm;
sensor means for monitoring the position of the suction means; and
control means, responsive to the sensor means, for automatically controlling the displacement means in order to grip the object and place the object in a predetermined location.

15. The robot of claim 14, wherein the operating arm serves to transport the handling device and wherein the handling device serves to place the object into a predetermined location upon immobilization of the operating arm.

16. A process for lining the interior of an enclosure with bricks comprising:
disposing a robot for the automatic handling of bricks within the enclosures, said robot comprising:
a displaceable operating arm; ·
a handling device secured to the operating arm, said handling device comprising:
suction means for supporting the object, said suction means comprising:
a suction plate for gripping the object;
carriage means for supporting the plate;
first mounting means for transversely slideably mounting the plate on the carriage means;
central support means for angularly and linearly displaceably supporting the carriage means on an operating arm,
second mounting means for longitudinally slideably mounting the carriage on the central support means, and
displacement means for displacing said suction plate relative to the operating arm;
sensor means for monitoring the position of the suction means;
control means, responsive to the sensor means, for automatically controlling the displacement means in order to grip the object and lace the object in a predetermined location;
disposing a plurality of bricks within the enclosure at a first predetermined location;
gripping a brick with the suction plate;
displacing the operating arm to transport the brick from the first predetermined location toward a second predetermined location;
displacing the suction plate relative to the operating arm,
monitoring position of the suction plate during its displacement;
automatically controlling the displacement of the suction plate in response to the mounted position of the suction plate to place the brick in a second predetermined location.

* * * * *